(12) United States Patent
Greene et al.

(10) Patent No.: US 10,337,685 B2
(45) Date of Patent: Jul. 2, 2019

(54) FIBER OPTIC LIGHT PANEL HAVING AESTHETIC APPEARANCE IN AN UNLIT STATE

(71) Applicant: Valeo North America, Inc., Troy, MI (US)

(72) Inventors: Kayla Greene, Seymour, IN (US); John Orisich, Seymour, IN (US); Brant Potter, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 15/217,703

(22) Filed: Jul. 22, 2016

(65) Prior Publication Data

US 2018/0023776 A1 Jan. 25, 2018

(51) Int. Cl.

| | |
|---|---|
| *F21V 8/00* | (2006.01) |
| *G02B 6/08* | (2006.01) |
| *F21S 41/24* | (2018.01) |
| *F21S 41/29* | (2018.01) |
| *F21S 41/37* | (2018.01) |
| *F21S 41/50* | (2018.01) |
| *F21S 43/33* | (2018.01) |
| *F21S 43/50* | (2018.01) |

(Continued)

(52) U.S. Cl.
CPC ............... *F21S 41/29* (2018.01); *F21S 41/24* (2018.01); *F21S 41/37* (2018.01); *F21S 41/50* (2018.01); *F21S 43/237* (2018.01); *F21S 43/245* (2018.01); *F21S 43/33* (2018.01); *F21S 43/50* (2018.01); *G02B 6/001* (2013.01); *G02B 6/0006* (2013.01); *G02B 6/08* (2013.01)

(58) Field of Classification Search
None
See application file for complete search history.

(56) References Cited

U.S. PATENT DOCUMENTS

| | | | | |
|---|---|---|---|---|
| 2008/0025039 A1* | 1/2008 | Guillermo | ............... | A42B 3/044 362/556 |
| 2009/0161378 A1* | 6/2009 | Enz | ........................ | B60R 1/1207 362/494 |
| 2015/0062954 A1* | 3/2015 | Crossland | ............. | D06P 1/0012 362/552 |

FOREIGN PATENT DOCUMENTS

EP 0359450 A2 3/1990

* cited by examiner

*Primary Examiner* — Anh T Mai
*Assistant Examiner* — Zachary J Snyder
(74) *Attorney, Agent, or Firm* — Oblon, McClelland, Maier & Neustadt, L.L.P.

(57) ABSTRACT

A lighting device for a vehicle includes a light source for generating light, and a lighting panel having a light emitting side and a light reflecting side opposing the light emitting side. The lighting panel includes an optical fiber layer having a plurality of optical fibers each configured to emit the light along a length of the optical fiber. The plurality of optical fibers are arranged in a predetermined form such that the optical fiber layer has a first side facing the light emitting side of the lighting panel and a second side facing the light reflecting side of the lighting panel. A reflecting layer is provided on the second side of the optical fiber layer and is configured to reflect the light toward the first side of the optical fiber layer. At least one layer of the lighting panel is an aesthetic layer selected for aesthetic appeal and being visible from the light emitting side of the lighting panel in an unlit state. A bundling element is configured to hold ends of the plurality optical fibers in a bundle which is optically coupled to the light source.

16 Claims, 5 Drawing Sheets

(51) Int. Cl.
*F21S 43/237* (2018.01)
*F21S 43/245* (2018.01)

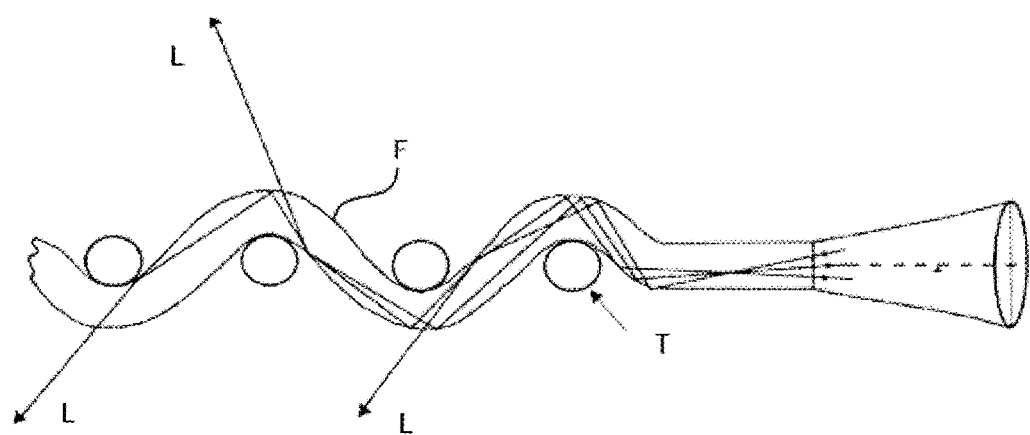
FIG. 4
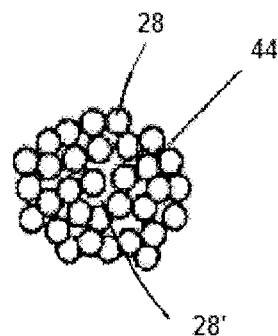 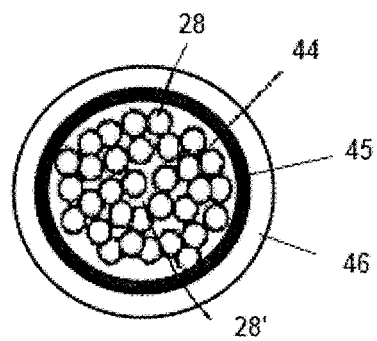
FIG. 5A               FIG. 5B

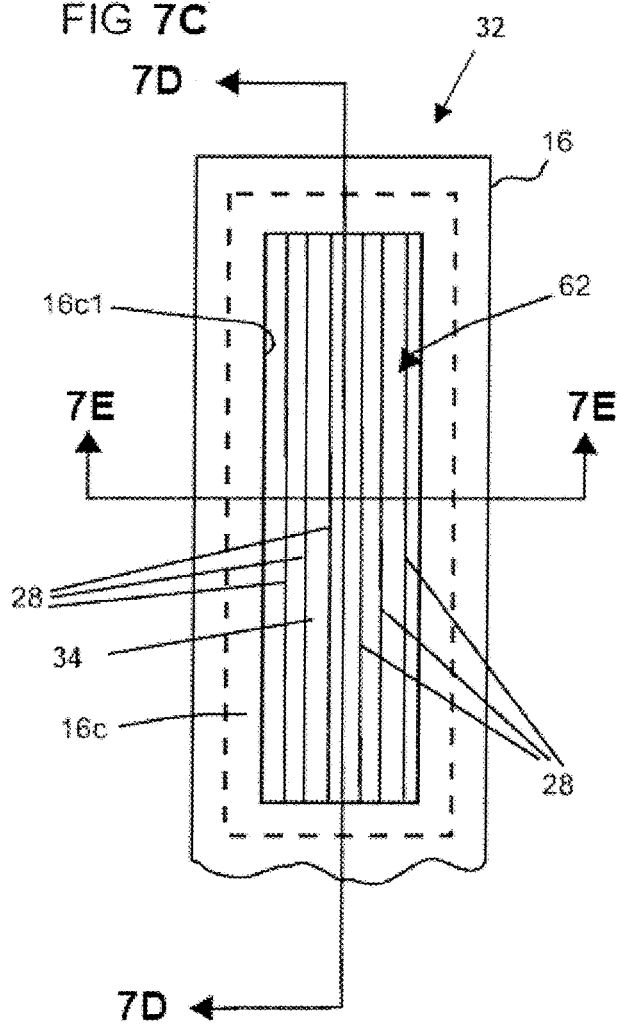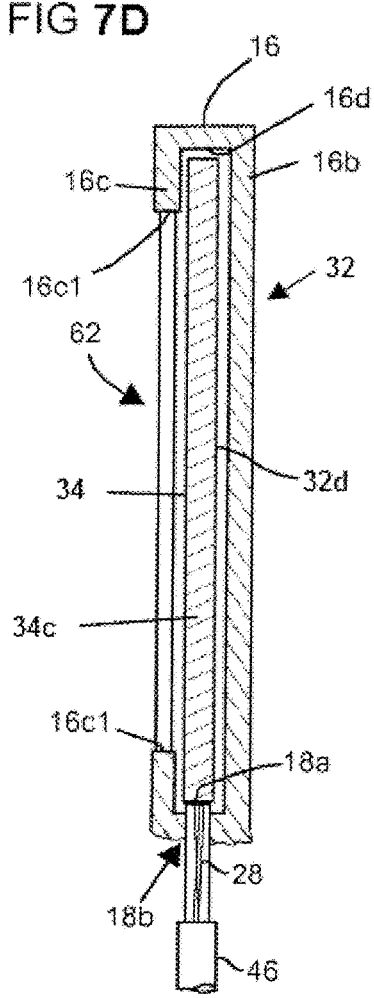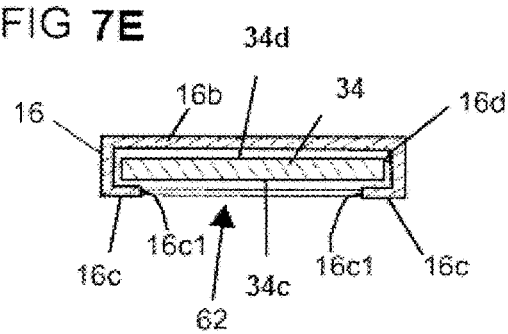

FIBER OPTIC LIGHT PANEL HAVING AESTHETIC APPEARANCE IN AN UNLIT STATE

FIELD OF THE INVENTION

This invention relates to lighting systems, and more particularly to a lighting and/or signaling device that utilizes fiber optic light panels.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, as of the date of this filing Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. For example, U.S. Pat. No. 6,874,925 discloses fiber optic light emitting panel assemblies. However, these assemblies have generally been limited to LCD backlighting, surgical devices, phototherapy and other applications not subject to the technical requirements of vehicle lighting.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to the styling of a vehicle.

Yet another object of the invention is to provide fiber optic vehicle light panel that enhances aesthetics of the vehicle design in an unlit state.

These and/or other objects may be provided by embodiments of the invention disclosed herein.

In one embodiment a lighting device for a vehicle includes a light source for generating light, and a lighting panel having a light emitting side and a light reflecting side opposing the light emitting side. The lighting panel includes an optical fiber layer having a plurality of optical fibers each configured to emit the light along a length of the optical fiber. The plurality of optical fibers are arranged in a predetermined form such that the optical fiber layer has a first side facing the light emitting side of the lighting panel and a second side facing the light reflecting side of the lighting panel. A reflecting layer is provided on the second side of the optical fiber layer and is configured to reflect the light toward the first side of the optical fiber layer. At least one layer of the lighting panel is an aesthetic layer selected for aesthetic appeal and being visible from the light emitting side of the lighting panel in an unlit state. A bundling element is configured to hold ends of the plurality optical fibers in a bundle which is optically coupled to the light source.

In one aspect, the light source includes a solid state light source. The plurality of optical fibers of the lighting device may be arranged in an array, or arranged in a woven configuration.

The at least one aesthetic layer of the lighting device can include the reflecting layer, and/or a highly reflective colored film. The highly reflective colored film may be a color which matches a color of the light generated by the light source.

The reflecting layer of the lighting device may include a metal which provides a metallic appearance of the light emitting side of the lighting panel in an unlit state. Alternatively, the reflecting layer includes a diffusive reflecting material partially coated with said metal. A partially coated amount of the metal provides the metallic appearance of the light emitting side of the lighting panel in the unlit state and leaves a portion of the diffuse reflecting material exposed. The metal may include at least one of aluminum, silver and gold.

The at least one aesthetic layer of the lighting device may include a structural layer configured to fix the lighting panel. The structural layer may include a bezel configured to fix the lighting panel in a predetermined shape.

The at least one aesthetic layer may include the fiber optic layer, and the plurality of optical fibers may be colored in an unlit state of the lighting panel. The fiber optic layer may include the plurality of optical fibers encapsulated in a colored medium having a predetermined color in an unlit state of the lighting panel.

The at least one layer of the lighting device may include a transmission layer provided on the light emitting side of the panel, and the transmission layer may be colored in an unlit state. The transmission layer may include a one way mirrored coating which transmits the light when the panel is in a lighted state, and which appears mirrored in an unlit state.

Another aspect of the invention includes a method of manufacturing a lighting device for a vehicle. The method includes providing a plurality of light sources each configured to generate light, providing a light panel including a plurality of optical fibers arranged in a predetermined form, and bundling ends of the optical fibers of the light panel together to form an input to the light panel. At least one aesthetic layer is provides visible from a light emitting side of the panel in an unlit state, and is selected to provide aesthetic appeal of the lighting device in an unlit state. One of said plurality of light sources is selected to provide a light output to compensate for optical properties of the aesthetic layer, and the selected light source is coupled to the light panel.

BRIEF DESCRIPTION OF THE DRAWINGS

In the Drawings:

FIG. 4 is a schematic view of another optical fiber adapted to emit light along a length of the optical fiber;

FIGS. 5A and 5B show alternative embodiments of a fiber bundle used in a lighting device in accordance with embodiments of the invention;

FIGS. 7A-7E show alternative configurations of an optical fiber panel in accordance with embodiments of the invention;

DETAILED DESCRIPTION OF SEVERAL EMBODIMENTS

Fiber optic light panels have previously been used in backlighting liquid crystal displays and electronic controls. U.S. patent application serial no. PCT/US2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. A reflective backing is provided on one side of the panel to reflect emitted light to a light output side of the panel. This reflective backing has conventionally been selected for its reflective properties regarding the light emitted from the panel. Specifically, the reflective backing has been selected to provide a diffusely reflective surface having very high reflectivity to light emitted from fibers of the panel. The present inventors have recognized, however, that reflective materials having such desirable properties for the emitted light have a characteristic unlit appearance which may be undesirable. For example, U.S. Pat. Nos. 6,874,925 and 5,307,245 disclose a reflective backing made of Mylar; Melinex is also known. These materials have a flat white appearance in an unlit state, which is aesthetically unappealing for automotive lighting applications.

Figure 1:
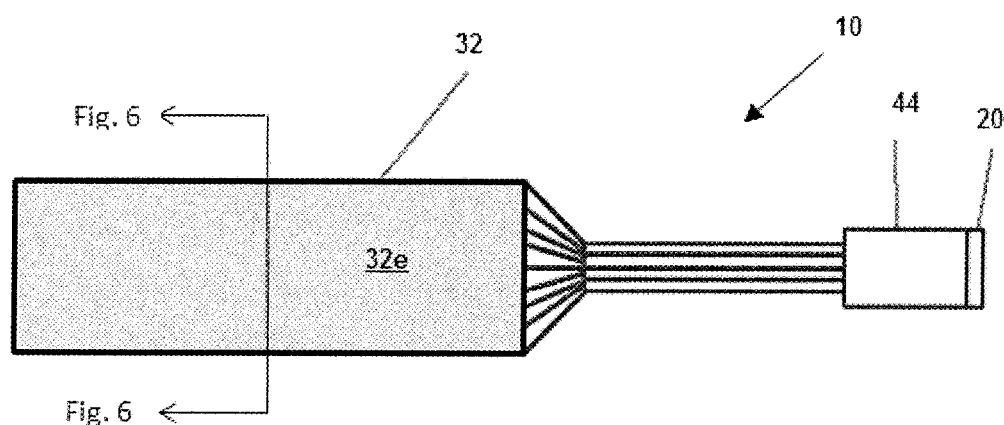
FIG. 1 is a schematic view of a fiber optic light panel device in accordance with embodiments of the invention.

FIG. 1 is a schematic representation of a lighting system in accordance with an embodiment of the invention. The lighting system 10 includes a light source 20, a fiber bundle 44, and a fiber panel 32. The light source 20 generates light for coupling to the fiber panel 32, which emits light from a surface thereof to meet the desired lighting function. A light emitting side of the panel 32 is indicated by 32e in FIG. 1. According to embodiments of the invention, at least one layer of the panel 32 is visible from the light emitting side 32e with the panel in an unlit state, and is selected for its aesthetic properties in the unlit state. The fiber bundle 44 groups fibers of the panel 32 in a configuration suitable for accepting light into the fiber panel 32.

The light source 20 may be any suitable source for generating light having photometric characteristics to provide a desired light output from panel 32. For example, the light source 20 may provide a lambertion pattern or any other radiation pattern of suitable flux, wavelength and intensity to satisfy the lighting function or aesthetic lighting affects of the panel 32. A layer in the panel 32 providing for unlit aesthetics according to the invention may alter or detract from light output characteristics of a panel 32 relative to conventional panels using a Melinex reflector. According to embodiments of the invention, other optical properties of the device are modified to compensate for this reduction so that a vehicle lighting device can meet technical specifications and also be stylish in an unlit state. For example, a panel having a desirable unlit appearance may reduce the light flux output at the panel 32, and a higher power light source is provided to compensate for this loss of efficiency.

The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2 W, 140 lm output at 2.65 v and 750 mA of current. Alternatively, a 860 mA, 6.29V, 510 lm white 1×2 LED source may be provided as light source 20. Halogen bulbs and/or an HID source may also be used.

Figures 2, 3:
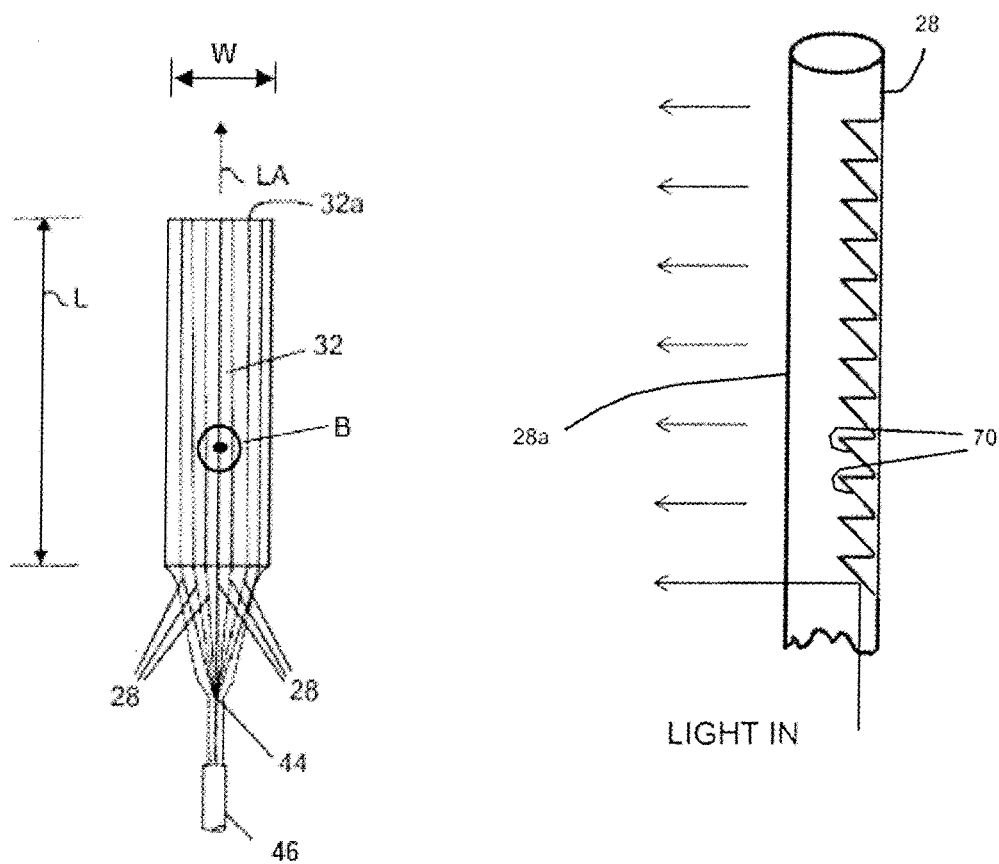
FIG. 2 is a planar view of a fiber optic light panel used in a lighting device according to embodiments of the invention.
FIG. 3 is a schematic view of an optical fiber adapted to emit light along a length of the optical fiber.

FIG. 2 is a view of a fiber optic light panel used in a lighting system according to embodiments of the invention. The fiber optic light panel 32 includes a plurality of optical fibers 28 that extend along a length L of the panel 32, terminating at an end 32a of the panel. The fibers 28 are arranged in an array along a width W such that they define a generally planar and generally rectangular panel 32. The panel 32 may assume other arrangements and forms and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not.

Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32.

It should be understood that the panel 32 may include any number of fibers 28 depending on the environment in which they are going to be used. In some of the embodiments, there are approximately fifty (50) fibers of 0.23 mm diameter per panel 32, or 100 fibers per inch width W (per layer). Obviously, these are just illustrations and other numbers and sizes of fibers 28 could be used. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

A conventional optical fiber generally transmits light through total internal reflection (TIR) from an input end to an output end of the fiber. According to embodiments of the invention, the fibers 28 of the optical light panel system 10 are configured and/or arranged such that light is emitted along a length of the fibers 28 making the panel 32 illuminate in a direction that is generally not parallel with a longitudinal axis LA of the fiber, as shown by point B in FIG. 2, which represents light rays coming out of the plane of the page.

FIG. 3 is a schematic view of an optical fiber adapted to emit light along a length of the optical fiber. To facilitate the light being emitted generally transverse to a longitudinal axis of the fiber 28, the fiber 28 may be modified to include optics such as a plurality of facets or reflective surfaces 70 which direct or reflect the light through a surface 28a of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etc. Further, depth, density and type of the alterations may be varied along the length of the fiber to achieve different light output effects along the fiber. For example, spacing between reflective surfaces 70 may be varied in different portions of the fiber to achieve more or less light intensity at the surface 28a of the fiber.

FIG. 4 is a schematic view of another optical fiber adapted to emit light along a length of the optical fiber. It has been found that wrapping or curving the fiber may also cause light to exit a side surface of the fiber F as shown in FIG. 4. Thus, causing at least one or a plurality of the optical fibers 28 to be curved along their longitudinal axis can enable the fibers to emit light or illuminate into a predetermined or desired direction, such as the direction indicated by point B in FIG. 2. It is desirable to capitalize on this feature by providing a woven pattern of the plurality of optical fibers 28 with fill thread T in order to generate a predetermined lighting function or result. A variety of weave patterns may be selected to produce a desired lighting function, effect or characteristic. In some embodiments, a light panel may include fibers which are altered as discussed in FIG. 3, and also woven, and also woven. Combinations of fiber alteration and weave may be used to achieve spatial effects for light output from the panel 32.

Returning again to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape. FIGS. 5A and 5B show alternative embodiments of a fiber bundle 44 and bundling elements used in a lighting system in accordance with embodiments of the invention. As seen in FIG. 5A, the fiber bundle 44 may be maintained by adhesive 28' provided between the fibers 28 as the bundling element to bond the fibers together. Alternatively, the fiber bundle 44 may be maintained by a coupling, 46 (such as a ferrule) as shown in FIG. 5B. The bundle 44 may also include a wrap, sleeve, adhesive, tape, resin or the like to facilitate holding the fibers 28 in the bundled position as illustrated by 45 in FIG. 5B.

Figure 6:
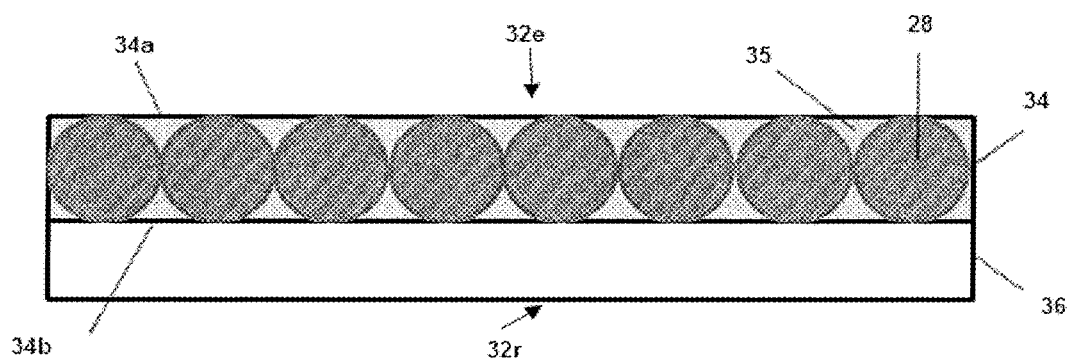
FIG. 6 is a cross-sectional view of an optical fiber panel in accordance with embodiments of the invention.

FIG. 6 is a schematic view of a cross-section of the lighting panel 32 in FIG. 1. As seen, the panel 32 is a layered structure including an optical fiber layer 34, and a reflecting layer 36. As seen, the panel 32 has a light emitting side 32e and a light reflecting side 32r. The optical fiber layer 34 includes a plurality of optical fibers 28 each configured to emit light along a length of the optical fiber as discussed above. The plurality of optical fibers 28 are arranged in a predetermined form such that the optical fiber layer 34 has a first side 34a facing the light emitting side 32e of the lighting panel and a second side 34b opposing the first side and facing the light reflecting side 32r of the lighting panel 32.

A reflecting layer 36 is provided on the second side 34b of the optical fiber layer 34. While shown in direct contact, one or more layers having optical properties may be interposed between the fiber layer 34 and reflecting layer 36. The reflecting layer 34 is configured to reflect light emitted along a length of the optical fibers toward the first side 34a of the optical fiber layer 32. According to embodiments of the invention, at least one layer of the lighting panel 32 is an aesthetic layer selected for aesthetic appeal in an unlit state, and is visible from the light emitting side 32e of the lighting panel in an unlit state. The aesthetic layer may be chosen to provide a desired unlit appearance in accordance with color, texture, shape, gloss or other desired characteristics.

In one embodiment, the at least one aesthetic layer may be the reflecting layer 36. For example, the reflecting layer 36 may be a highly reflective colored film of any color. The reflective layer may be made of a material which reflects only desired wavelengths which make the reflective layer 36 appear as a selected color through the fibers 28 in an unlit state. The reflective layer 36 may be a color which matches a color of the light generated by the light source 20, for efficiency, or a colored film selected solely for aesthetic reasons in an unlit state of the panel 32. For example, the reflective layer 36 may be selected to provide an unlit color which matches the vehicle paint color or trim color.

Figure 7A:
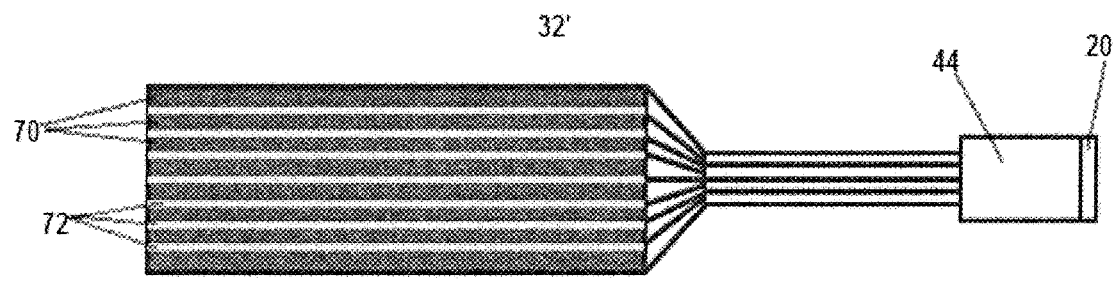

Alternatively, the reflecting layer 36 may be made from a metal to provide a metallic appearance at the light emitting side 32e of the lighting panel 32 in an unlit state. For example, the reflecting layer may be a metal film completely covering the second side 34b of the fiber layer 34. Alternatively, the reflecting layer may be a film having a metalized surface. For example, a conventional Mylar or Melinex layer having highly diffuse reflective properties, which is partially coated with the metal. FIG. 7A shows an embodiment of the light panel 32' having a reflective layer 36' viewable in an unlit state and having a partial metal coating 70 thereon. In the embodiment shown, the metal coating is provided in regions of a Mylar layer other than the fiber locations, such that Mylar regions 72 remain exposed. The metal regions 70 provide spectral reflection in a lighted state of the panel 32, while the Mylar regions 70 provide diffuse reflection in regions corresponding to the fiber locations. The amount of metal coating is selected to provide a desired metallic appearance at the light emitting side of the lighting panel in an unlit state, but also allow diffuse light to be reflected by the Mylar in a lighted state. In one example, the entire aesthetic surface is metalized. The metal 70 may be at least one of aluminum, silver and gold, for example.

Figure 7B:
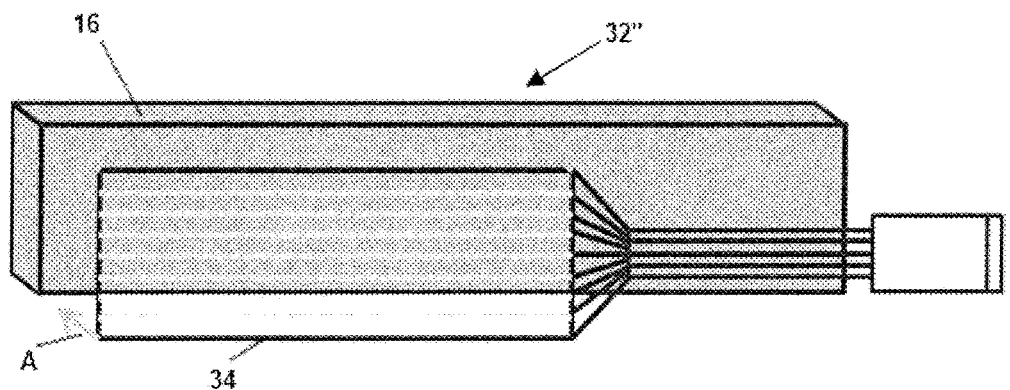

The at least one aesthetic layer may be a structural layer configured to shape the lighting panel 32. FIG. 7B provides a conceptual view of a light emitting panel 32" having a structural aesthetic layer. As seen, the fiber layer 34 may be bonded to the structural layer 16 having colored, reflective and/or metallic properties. The structural layer 16 may include a bezel configured to fix the lighting panel 32 in a predetermined shape. FIGS. 7 C-E show fragmentary and sectional views of a lighting device having a structural support in accordance with embodiments of the invention. As seen, the lighting device includes a structural support or frame 16 which receives the fiber layer 34. The support or frame 16 includes a back wall 16b and a wall 16c that generally opposes the back wall 16b as shown in FIG. 7D to provide a bezel for the fiber layer 34. In the embodiment shown, the wall 16c frames fiber layer 34. An interior edge 16c1 of the wall 16c defines a window or an aperture 62 through which light from the first side 34c of the layer 34 may be emitted. The fiber layer 34 is inserted into the support or frame 16 such that the light emitting side 34e is exposed.

For ease of illustration, common part numbers in FIGS. 7C-7E are identified with the same part numbers. As noted previously, the support or frame 16 may be curved; however, FIGS. 7C-7E are simplified views of the panel 32 without any curvature. A joining wall 16d joins the wall 16c to the rear wall 16b. In the embodiment of FIGS. 7A-7C, the rear wall 16b is solid and provides a reflective layer which covers the side 34d of the fiber layer 34. Light from the fiber layer 34 may be emitted from the back side of the layer 34 to reflect off of the rear wall 16b, pass through the fiber layer 34 and through the aperture 62. The wall 16b provides the aesthetic layer of the assembly, and may be colored any desired color or metalized as discussed above. It should also be appreciated that one or more fiber layers 34 may be received together and housed in the support. The support can be opaque or translucent (to emit light in a soft glow) for aesthetic value.

The at least one aesthetic layer may be the fiber optic layer 34. For example, the plurality of optical fibers 28 may be colored fibers in an unlit state of the lighting panel 32. Alternatively, the plurality of optical fibers 28 may be encapsulated in a colored medium 35 as shown in FIG. 6. The colored medium 35 has a predetermined color in an unlit state of the lighting panel.

The at least one aesthetic layer may be an additional layer of the panel 32. For example, a transmission layer may be provided on the light emitting side 32e of the panel. The transmission layer may be colored in an unlit state, or may have a "one way mirror" coating which transmits light from the optical fibers 28 in a lighted state, but appears as a reflective mirror in an unlit state.

A transmission layer may be provided on a reflecting side of the panel 32 between the reflecting layer 36 and the fiber layer 32. Such a transmission layer may be a colored material providing any desired color in an unlit state.

Figure 8A:
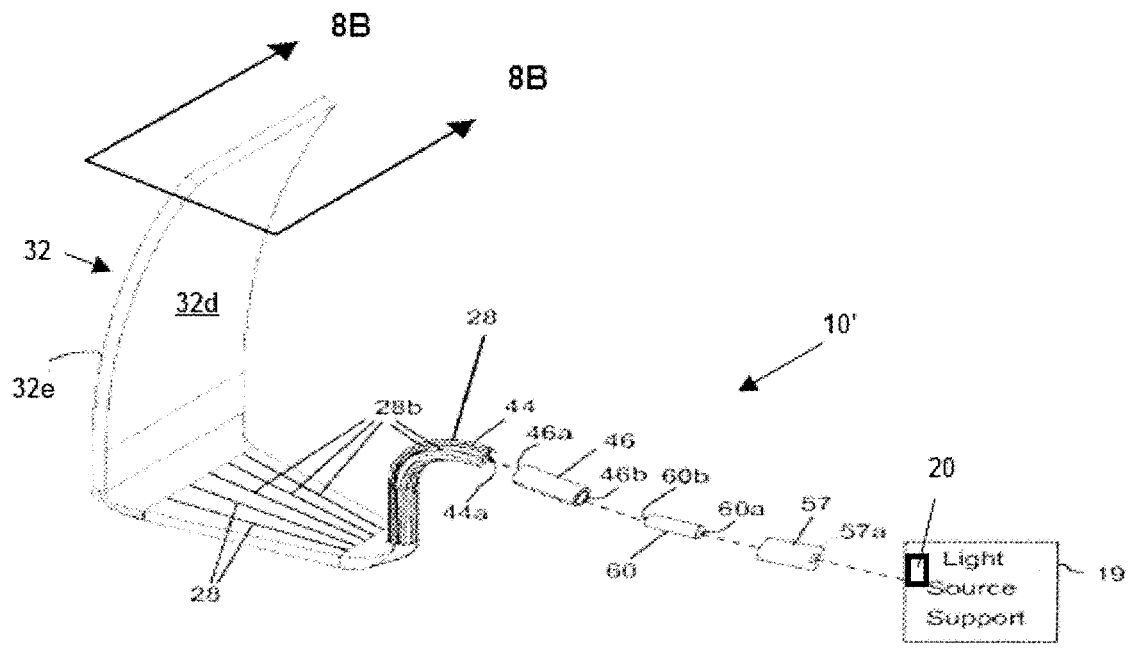
FIG. 8A is an exploded view drawing showing the components of an exterior vehicle lighting device in accordance with an embodiment of the invention.

FIG. 8A is an exploded view showing arrangement of the components of a vehicle lighting device in accordance with an embodiment of the invention. For example, the device 10' may be included in the headlight or taillight of a vehicle V as shown in FIG. 8C. As seen in FIG. 8A, the system 10' includes a panel 32 having a light emitting side 32e through which light from the plurality of optical fibers 28 is emitted, and a light reflecting side 32c which may be partially or fully coated with a reflective material in order to reflect light through side 32e as discussed above.

Figure 8B:
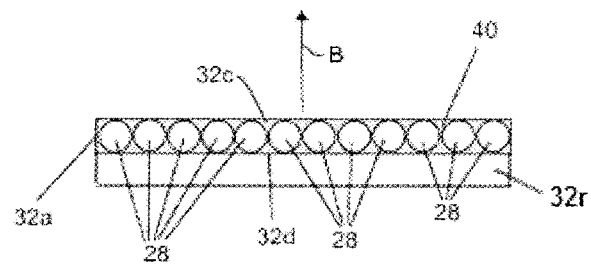
FIG. 8B is a sectional view of the panel of the device in FIG. 8A.
Figure 8C:
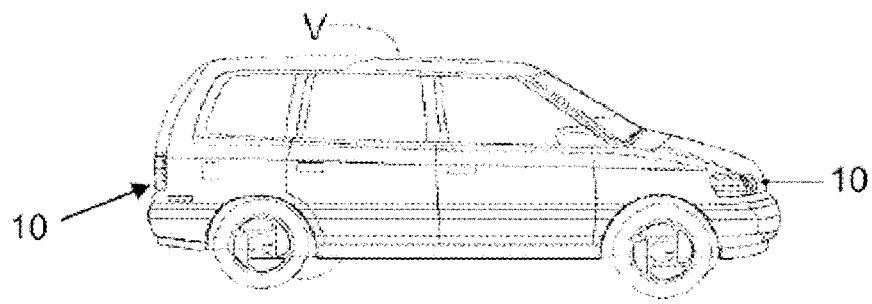
FIG. 8C is a view of a vehicle including a fiber optic light panel device according to embodiments of the invention.

FIG. 8B is a sectional view of the panel of FIG. 8A. As seen, fibers 28 are arranged in a fiber array and embedded in a substrate 40, which could be a polymer, resin or other conventional substrate. Portions 28b of the plurality of optical fibers 28 extend out of the substrate 40 and panel 32 and are gathered and combined in a fiber bundle 44 to define a light-receiving end or input end 44a. In the embodiment of FIG. 8A, the input end 44a becomes operatively positioned in a first end 46a of a mechanical coupler 46 having opposing end 46b. The coupler 46 may be a ferrule and include a wrap, sleeve, adhesive, tape, resin or the like to facilitate holding the fibers 28 in the bundled position illustrated in FIG. 5B.

Optical coupler 60 has a first and second ends 60a and 60b. The first end 60a is mechanically coupled to, and received in, a hollow plug 57. Second end 60b is received in the second end 46b of coupler 46 to optically align coupler/60 to the fiber bundle 44. During assembly, an end 57a of the plug 57 is coupled to the light source support of a vehicle light housing to provide optical coupling with the light source 20. In the illustration, the optical coupler 60 is an integral one piece construction made of silicone or plastic. The optical coupler 60 may be an optical mixer configured to improve a homogeneous property of light coupled to the fiber bundle as disclosed in the patent application titled FIBER OPTIC LIGHT PANEL WITH HOMOGENEOUS LIGHT OUTPUT, filed by the present Applicants on common date herewith. The entire contents of this application is incorporated herein by reference.

It should be understood that the illustrations being described show a single light source 20 associated with a single panel 32, but a single light source 20 may be used for multiple panels 32. For example, ends of the optic fibers 28 of different panels 32 may be bundled and coupled to a single coupler 46 associated with the single light source 20. In such configuration, the light source 20 is optically coupled to the optical fibers 28 from multiple panels 32, and a single light source 20 can be used with multiple panels 32. In such a case, it may be necessary to provide a coupler (not shown) that is adapted to receive the multiple bundles of fibers 28. Alternatively, the optical mixer 60 may be shaped to provide three separate input surfaces for coupling three light sources to a fiber bundle.

Advantageously the embodiments described herein are particularly suited for exterior lighting and in environments where it is necessary that the lighting match or conform to the contour or styling of the vehicle V.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A lighting device for a vehicle, comprising:
a light source for generating light;
a lighting panel having a light emitting side and a light reflecting side opposing the light emitting side, the lighting panel comprising:
an optical fiber layer comprising a plurality of optical fibers each configured to emit said light along a length of the optical fiber, the plurality of optical fibers being arranged in a predetermined form such that the optical fiber layer has a first side facing said light emitting side of the lighting panel and a second side facing said light reflecting side of the lighting panel, and
a reflecting layer provided on said second side of the optical fiber layer and configured to reflect said light toward the first side of the optical fiber layer, wherein the reflecting layer of the lighting panel is an aesthetic layer selected for aesthetic appeal and being visible from the light emitting side of the lighting panel in an unlit state, said reflecting layer comprising a diffusive reflecting film partially coated with a metal such that a portion of the diffusive reflecting film is exposed, wherein a partially coated amount of said metal provides a metallic appearance of the light emitting side of the lighting panel in the unlit state and said portion of the diffusive reflecting film provides diffuse reflection of said light when the light source is in a lighted state; and
a bundling element configured to hold ends of the plurality optical fibers in a bundle which is optically coupled to said light source.

2. The lighting device of claim 1, wherein the light source comprises a solid state light source.

3. The lighting device of claim 1, wherein said plurality of optical fibers are arranged in an array.

4. The lighting device of claim 1, wherein said plurality of optical fibers are arranged in a woven configuration.

5. The lighting device of claim 1, wherein said reflecting layer further comprises a highly reflective colored film.

6. The lighting device of claim 5, wherein said highly reflective colored film is a same color as a color of the light generated by said light source.

7. The lighting device of claim 1, wherein said metal comprises at least one of aluminum, silver and gold.

8. The lighting device of claim 1, wherein said at least one reflecting layer is a structural layer configured to fix said lighting panel.

9. The lighting device of claim 8, wherein said structural layer includes a bezel configured to fix the lighting panel in a predetermined shape.

10. The lighting device of claim 1, wherein said at least one aesthetic layer further comprises said fiber optic layer.

11. The lighting device of claim 10, wherein said plurality of optical fibers are colored in an unlit state of the lighting panel.

12. The lighting device of claim 10, wherein said fiber optic layer comprises said plurality of optical fibers encapsulated in a colored medium having a predetermined color in an unlit state of the lighting panel.

13. The lighting device of claim 1, wherein said at least one aesthetic layer further comprises a transmission layer provided on said light emitting side of the panel.

14. The lighting device of claim 13, wherein said transmission layer is colored in an unlit state.

15. The lighting device of claim 13, wherein said transmission layer comprising a one way mirrored coating which transmits said light when the panel is in a lighted state, and which appears mirrored in an unlit state.

16. A method of manufacturing a lighting device for a vehicle, comprising:
providing a plurality of light sources each configured to generate light;
providing a light panel comprising a plurality of optical fibers arranged in a predetermined form;
bundling ends of the optical fibers of the light panel together to form an input to the light panel;
providing a reflecting layer of the light panel as aesthetic layer visible from a light emitting side of the panel in an unlit state and selected to provide aesthetic appeal of the lighting device in an unlit state, said reflecting layer comprising a diffusive reflecting film partially coated with a metal such that a portion of the diffusive reflecting film is exposed, wherein a partially coated amount of said metal provides a metallic appearance of the light emitting side of the lighting panel in the unlit state and said portion of the diffusive reflecting film provides diffuse reflection of said light when the light source is in a lighted state;
selecting one of said plurality of light sources which provides a light output to compensate for optical properties of said aesthetic layer, and
coupling the selected light source to the light panel.

* * * * *